S. J. HARE.

Hot-Air Furnace.

No. 84,356.

Patented Nov. 24, 1868.

Witnesses.
Wm. A. Morgan
J. C. Cotton

Inventor.
S. J. Hare
per Munn & Co.
attys

S. J. HARE, OF LOUISVILLE, KENTUCKY.

Letters Patent No. 84,356, dated November 24, 1868.

IMPROVEMENT IN HOT-AIR FURNACES.

The Schedule referred to in these Letters Patent and making part of the same.

*To all whom it may concern:*

Be it known that I, S. J. HARE, of Louisville, in the county of Jefferson, and State of Kentucky, have invented a new and useful Improvement in Hot-Air Furnaces; and I do hereby declare that the following is a full, clear, and exact description thereof, which will enable those skilled in the art to make and use the same, reference being had to the accompanying drawings, forming part of this specification.

This invention relates to improvements in furnaces for heating air for warming buildings; and consists in the arrangement of parts, whereby a very large heat-radiating surface is secured, and the heat generating from the fuel is utilized.

Similar letters of reference indicate corresponding parts.

Figure 1:
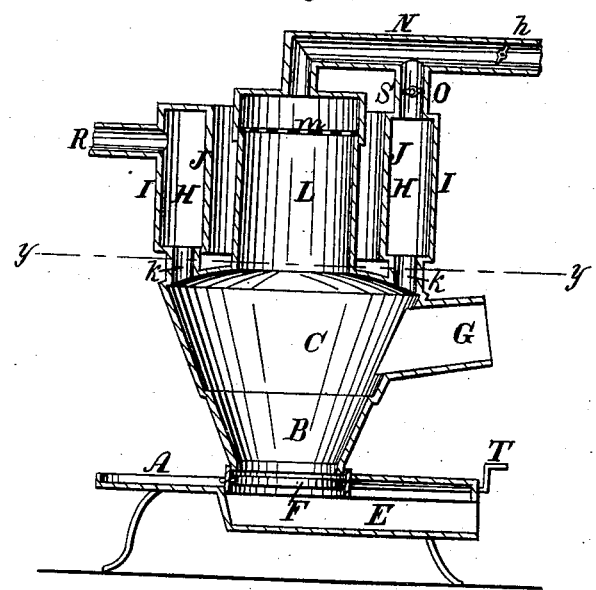
Figure 1 is a sectional elevation of the furnace, through the line $x\ x$ of fig. 2.
Figure 2:
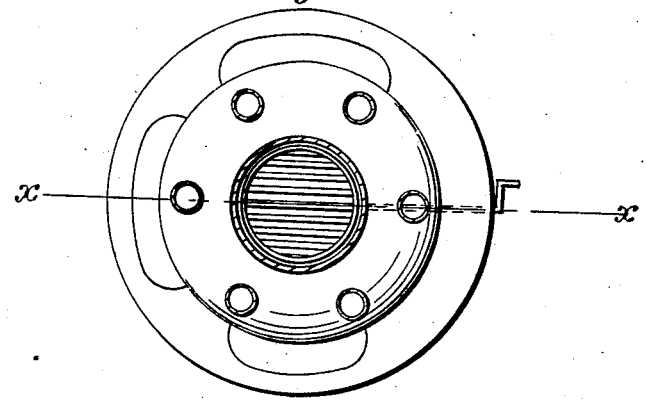
Figure 2 is a horizontal section through the line $y\ y$ of fig. 1.

A is the hearth of the furnace.

B is the fire-box.

C is the combustion-chamber.

E represents the ash-pit.

F is the fire-grate.

G is the aperture for the introduction of fuel.

H represents an annular drum, formed by an outer cylinder, I, and an inner cylinder, J. This annular drum H is connected with the combustion-chamber C by a series of short tubes, $k$.

L is a cylindrical chamber, which is connected with the combustion-chamber C, and is, in fact, a continuation of that chamber.

$m$ is a heavy perforated plate, situated near the upper part of L. This plate becomes heated to a high temperature, and aids greatly in producing a perfect combustion of the unconsumed gases and smoke.

N is a pipe, through which atmospheric air is admitted to the chamber L, through the perforated plate $m$.

The annular drum H is the general receptacle for the products of combustion through the short pipes $k$.

R is the discharge-pipe for the unconsumed smoke and gases.

The atmospheric air, which is admitted through the heavy perforated plate $m$, mingles with the gases in the combustion-chamber, and aids greatly in consuming them.

There is a damper in the pipe, O, as seen at S, which, when open, allows communication between the chamber L and the annular drum H. When air is admitted, this damper would be closed, and the damper $p$ opened.

It will be seen that the outsides of the cylindrical chamber L, and the cylinders I J, forming the annular drum H, are heat-radiating surfaces.

T is a crank for reversing or agitating the fire-grate.

The advantages of this arrangement are many and obvious.

Mingling atmospheric air with the products of combustion in the very large combustion-chamber, greatly economizes fuel.

The carbonic oxide formed in that chamber only requires a proper supply of oxygen for its entire consumption.

In all furnaces, where there is not the requisite quantity of atmospheric air (or oxygen) supplied, the carbonic oxide passes off unconsumed.

The very extensive heat-generating surface presented by this arrangement, in combination with the provision for consuming the smoke and gases, must render it very effective and economical as an air-heating furnace.

I claim as new, and desire to secure by Letters Patent—

The described arrangement of the annular outer drum H, formed by the cylinders I J, and supported above the combustion-chamber C by the short pipes $k$, the central chamber L containing the perforated plate $m$, the air-pipe N and pipe O connecting the chamber L and drum H, the damper S, combustion-chamber C, and fire-chamber B, all constructed and operating as described, for the purpose specified.

S. J. HARE.

Witnesses:
 JAMES SOMERVILLE,
 C. G. GORDON.